United States Patent
Simonffy

[15] 3,661,471
[45] May 9, 1972

[54] THREAD CUTTING TOOLS

[72] Inventor: Louis Simonffy, 7253 West Lafayette, Detroit, Mich. 48209

[22] Filed: Oct. 12, 1970

[21] Appl. No.: 79,841

[52] U.S. Cl. ............................ 408/220, 408/221, 408/222, 10/141
[51] Int. Cl. .................................... B23g 5/04, B23g 5/06
[58] Field of Search ................ 408/215, 216, 219, 220, 221, 408/222, 227, 229; 10/141

[56] References Cited
UNITED STATES PATENTS

| | | | |
|---|---|---|---|
| 2,024,169 | 12/1935 | Koonz | 408/220 |
| 1,293,432 | 2/1919 | Higgins | 408/219 |

*Primary Examiner*—Gil Weidenfeld
*Attorney*—Adolph G. Martin

[57] ABSTRACT

Tools for cutting threads in certain extremely hard materials like the aluminum bronzes, such tool being characterized by four lineal arrays of teeth equally spaced around a longitudinal axis and substantially equidistant therefrom. One pair of said arrays has a series of long teeth interspersed with a series of short teeth, and the other such pair has teeth of uniform length which are slightly shorter than the long teeth in the first mentioned arrays. An inwardly inclined chip clearance surface on each tooth extends rearwardly to a point below the root of the tooth. A flat cutting face on the teeth in each pair of lineal arrays extends below the root thereof, and is disposed at substantially right angles to a transverse medial plane through the other pair of lineal arrays.

3 Claims, 6 Drawing Figures

PATENTED MAY 9 1972 3,661,471
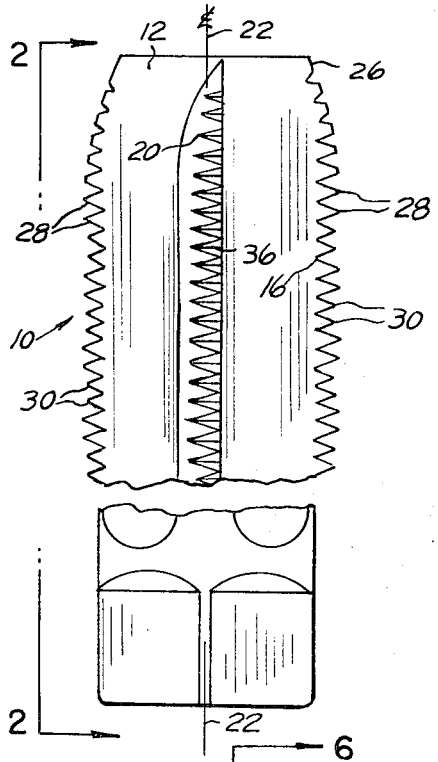
FIG.1
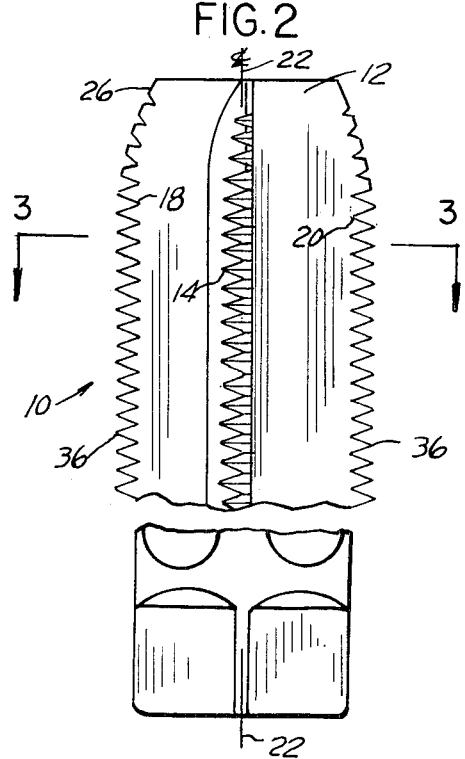
FIG.2
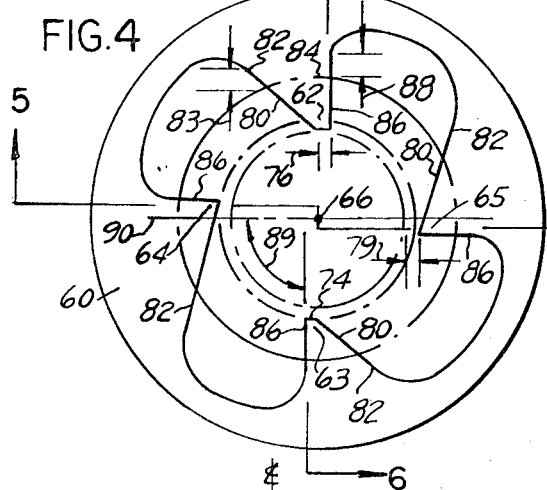
FIG.4
FIG.5
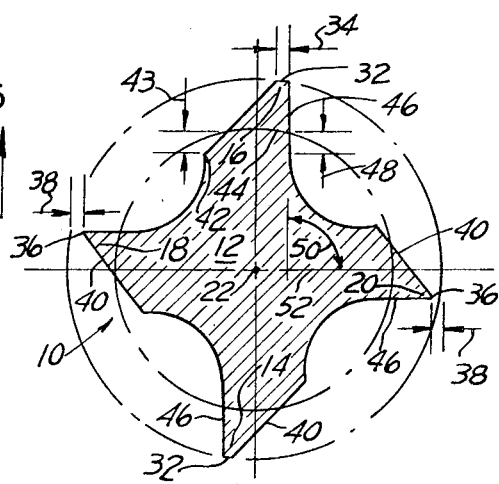
FIG.3
FIG.6
INVENTOR
LOUIS SIMONFFY
BY Joseph G. Martin
ATTORNEY

THREAD CUTTING TOOLS

BACKGROUND OF THE INVENTION

This invention relates generally to thread cutting tools, but more particularly to taps and dies for use in working extremely hard materials, such as the aluminum bronzes. Conventional taps and dies, when used on this material have a tendency to over-heat, bind and eventually break, even though coolants, lubricants, and cutting compounds are employed. For this reason, the applicant has designed teeth for taps and dies which enables them readily to cut threads in aluminum bronze.

SUMMARY OF THE INVENTION

This invention consists of thread cutting tools each comprising a body having four laterally spaced lineal arrays of teeth substantially equidistant from the longitudinal axis of the body. One pair of the lineal arrays has a series of long teeth interspersed with a series of short teeth. The other pair of lineal arrays has teeth of uniform length which are slightly shorter than the long teeth in the first mentioned pair. An inwardly inclined chip clearance surface on each tooth extends rearwardly to a point below the root of the tooth. A flat cutting face on each tooth extends approximately 0.020 inch below the root thereof, with said faces on each pair of lineal arrays being disposed at substantially right angles to a transverse medial plane through the other pair of lineal arrays.

BRIEF DESCRIPTION OF THE DRAWING

FIG. 1 is a side elevation view of a tap embodying the applicant's invention, showing the spaced groups of short and full-size long teeth 30 and 28 respectively on lineal arrays 14 and 16.

FIG. 2 is a side elevation view, taken substantially on plane 2—2 in FIG. 1, showing the short teeth 36 of uniform length, on lineal arrays 18 and 20.

FIG. 3 is an enlarged section view, taken substantially on plane 3—3 in FIG. 2, showing the cutting faces 46 and the clearances 40 on the teeth in the four lineal arrays 14,16,18 and 20.

FIG. 4 is a top plan view of a die embodying the applicant's invention, showing the cutting faces 86 and the clearance surfaces 80 on the teeth.

FIG. 5 is a section view, taken substantially on plane 5—5 in FIG. 4, showing the short teeth 78 of uniform length on lineal arrays 64 and 65.

FIG. 6, is a section view, taken substantially on plane 6—6 in FIG. 4, showing the spaced groups of short and full-size long teeth 72 and 70 respectively on lineal arrays 62 and 63.

CONSTRUCTION

For a more detailed description of the invention, reference is made to FIGS. 1,2 and 3 of the drawing, in which numeral 10 designates a tap with an elongated fluted body 12 having thereon four lineal arrays of teeth 14,16,18 and 20 are substantially equidistant from the longitudinal axis 22 of the elongated fluted body 12, and angularly spaced from each other by approximately 90°.

A chamfered or tapered section 26 is provided on all the teeth at the forward end of the elongated fluted body 12. Oppositely disposed lineal arrays 14 and 16 have a series of full-size long teeth 28, and a series of teeth 30 which are at least 0.006 inch shorter. The full-size long teeth 28 are arranged in spaced groups of two each, with the most forwardly disposed group being located immediately adjacent the chamfered section 26.

The series of shorter teeth 30 are arranged in groups of at least two each, which are positioned in the spaces between the groups of full-size long teeth 28, as shown in FIG. 1. A land 32, on each of the teeth 28 and 30 in lineal arrays 14 and 16, has a lateral width, shown by 34 in FIG. 3, which may be varied in size from 0.003 to 0.005 inch for optimum results.

The other oppositely disposed lineal arrays 18 and 20 have teeth 36 of uniform length which are at least 0.006 inch shorter than the full-size long teeth 28 in the lineal arrays 14 and 16, shown by 38 in FIG. 3. An inwardly disposed flat chip clearance surface 40 is provided on each of the teeth in the four lineal arrays 14, 16,18 and 20, which extends rearwardly from the trailing edge on each tooth to a point 42 adjacent the heel thereon which is 0.015 to 0.025 inch below the root 44 of the tooth, shown by 43 in FIG. 3.

A flat cutting face 46 on the forward side of each tooth in the four lineal arrays 14,16,18 and 20, extends 0.020 inch below the root 44 of the tooth, as shown by 48 in FIG. 3, and is substantially parallel to the longitudinal axis 22 of the elongated fluted body 12. The flat cutting faces 46 on the teeth 28 and 30 in one pair of the lineal arrays 14 and 16, are all disposed at an angle 50 of substantially 90° to a transverse medial plane 52 between the other pair of lineal arrays 18 and 20.

For optimum results the angle 50 should not be varied by more than 2°. In practice, when making taps for cutting larger threads, the teeth 36 of uniform length in lineal arrays 18 and 20, are further shortened, and made as much as 0.015 inch shorter than the long teeth 28 in lineal arrays 14 and 16 to prevent binding and insure optimum results.

FIGS. 4,5 and 6 disclose a die with a cylindrical body 60 having therein four lineal arrays of teeth 62,63,64 and 65. The four lineal arrays of teeth 62, 63,64 and 65 are substantially equidistant from the longitudinal axis 66 of the cylindrical body 60, and angularly spaced from each other by approximately 90°. A chamfered or tapered section 68 is provided on all the teeth at the forward end of the cylindrical body 60.

Oppositely disposed lineal arrays 62 and 63 have therein a series of full-size long teeth 70, and a series of short teeth 72, which are at least 0.006 shorter than the full-size long teeth 70. The full-size long teeth 70 are arranged in spaced groups of two each, with the most forwardly disposed group being located immediately adjacent the chamfered or tapered section 68.

The series of short teeth 72 are arranged in groups of at least two each, and positioned in the spaces between the groups of full-size teeth 70, as shown in FIG. 6. The land 74 on each of the teeth in the lineal arrays 62 and 63, has a lateral width, shown by 76 in FIG. 4, which may be varied in size from 0.003 to 0.005 inch for optimum results. The other oppositely disposed lineal arrays 64 and 65 have teeth 78 of uniform length, which are at least 0.006 inch shorter than the full-size long teeth 70 in the lineal arrays 62 and 63, as shown by 79 in FIG. 4.

An inwardly disposed flat chip clearance surface 80 is provided on each of the teeth in the four lineal arrays 62,63,64 and 65, which extends rearwardly from the trailing edge of each tooth to a point 82 adjacent the heel thereon which is 0.015 to 0.025 inch below the root 84 of the tooth, shown by 83 in FIG. 4. A flat cutting face 86 on the forward side of each tooth in the four lineal arrays 62,63,64 and 65, extends 0.020 inch below the root 84 of the tooth, as shown by 88 in FIG. 4, and is substantially parallel to the longitudinal axis 66 of the cylindrical body 60.

The flat cutting faces 86 on the teeth in one pair of the lineal arrays 62 and 63, are all disposed at an angle 89 of substantially 90° to a transverse medial plane 90 between the other pair of lineal arrays 64 and 65. For optimum results the angle 89 should not be varied by more than 2°. In practice, when making dies for cutting larger threads, the teeth 78 of uniform length in lineal arrays 64 and 65, are further shortened, and made as much as 0.015 inch shorter than the full-size long teeth 70 in lineal arrays 62 and 63 to prevent binding and insure optimum results.

In practice, the size opening specified for a particular tap size, under standard shop procedures well known in the tool industry, should be increased by at least 0.004 inch to insure optimum results with the applicant's taps. Likewise, for optimum results with the applicant's dies, the size of stock specified for a particular thread size should be decreased by at least 0.004 inch. The applicant's taps and dies were designed and intended for use especially with the aluminum bronzes, and are accordingly unsuited for use in working softer materials such as copper and brass.

Based upon the foregoing discussion, the applicant is of the opinion that his invention has fulfilled a long-felt need in the field of thread cutting tools, and that he has accordingly made a valuable contribution to the related art. However, while the invention was described with reference to the structural details of a limited number of embodiments, it will be appreciated by those familiar with the art that the principles involved are susceptible of numerous other practical adaptations.

I therefore claim as new, and desire to secure by Letters Patent:

1. A thread cutting tool comprising a body, four lineal arrays of teeth on the body substantially equidistant from the longitudinal axis thereof and angularly spaced from each other by 90°, a chamfered section on the teeth at the forward end of the body, one oppositely disposed pair of such lineal arrays having a series of long teeth interspersed with a series of short teeth, the other oppositely disposed pair of such lineal arrays having teeth of uniform length which are shorter than the long teeth in the first mentioned pair of lineal arrays, a land on each of the teeth in the first mentioned pair of lineal arrays having a lateral width which may vary from 0.003 to 0.005 inch, an inwardly and rearwardly disposed chip clearance surface on each tooth of the four lineal arrays extending from the trailing edge of the land thereon to a point adjacent the heel of such tooth which is at least 0.015 inch below the root thereof, and a flat cutting face on each tooth in the four lineal arrays extending at least 0.020 inch below the root of the tooth, said cutting faces on the teeth of each pair of lineal arrays being disposed at substantially right angles to a transverse medial plane through the other pair of lineal arrays.

2. The thread cutting tool of claim 1 in which the series of long teeth on the first mentioned pair of lineal arrays comprises spaced groups of two teeth each and the series of short teeth consists of groups having at least two teeth each, all of which are at least 0.006 inch shorter than the long teeth, with said groups of shorter teeth being located in the spaces between the groups of long teeth.

3. The thread cutting tool of claim 2 in which the series of long teeth on the first mentioned pair of lineal arrays has the most forwardly disposed group thereof located immediately adjacent the chamfered section on the body.

* * * * *